Patented Nov. 26, 1940

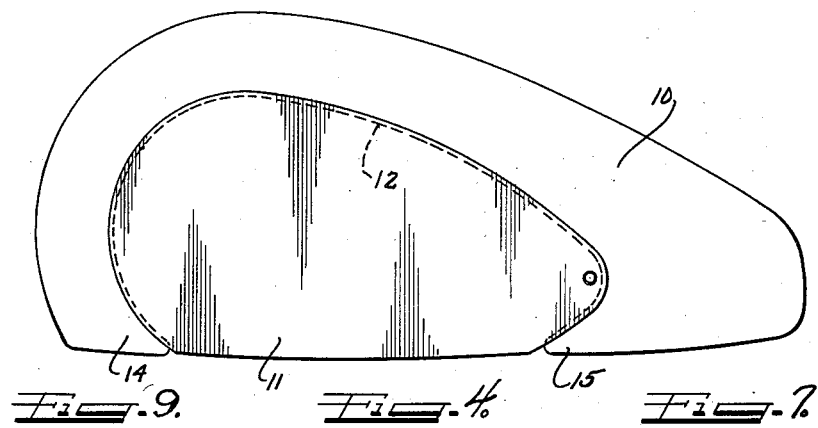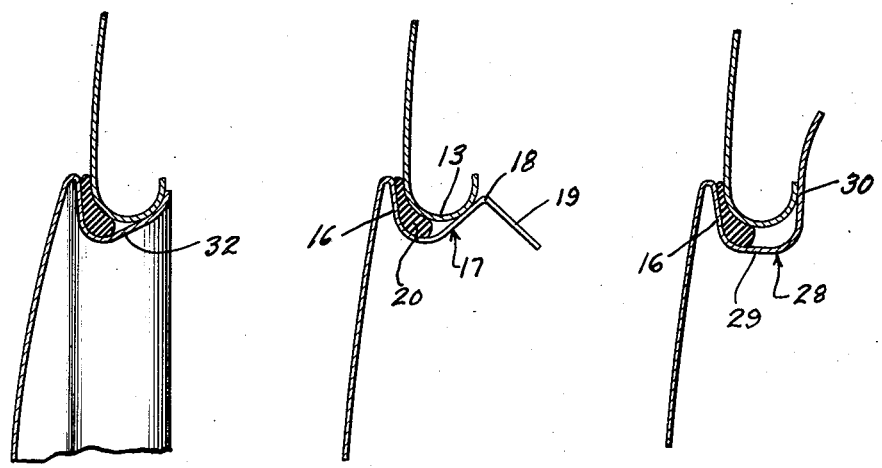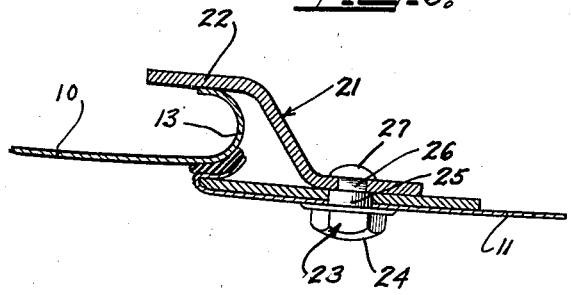

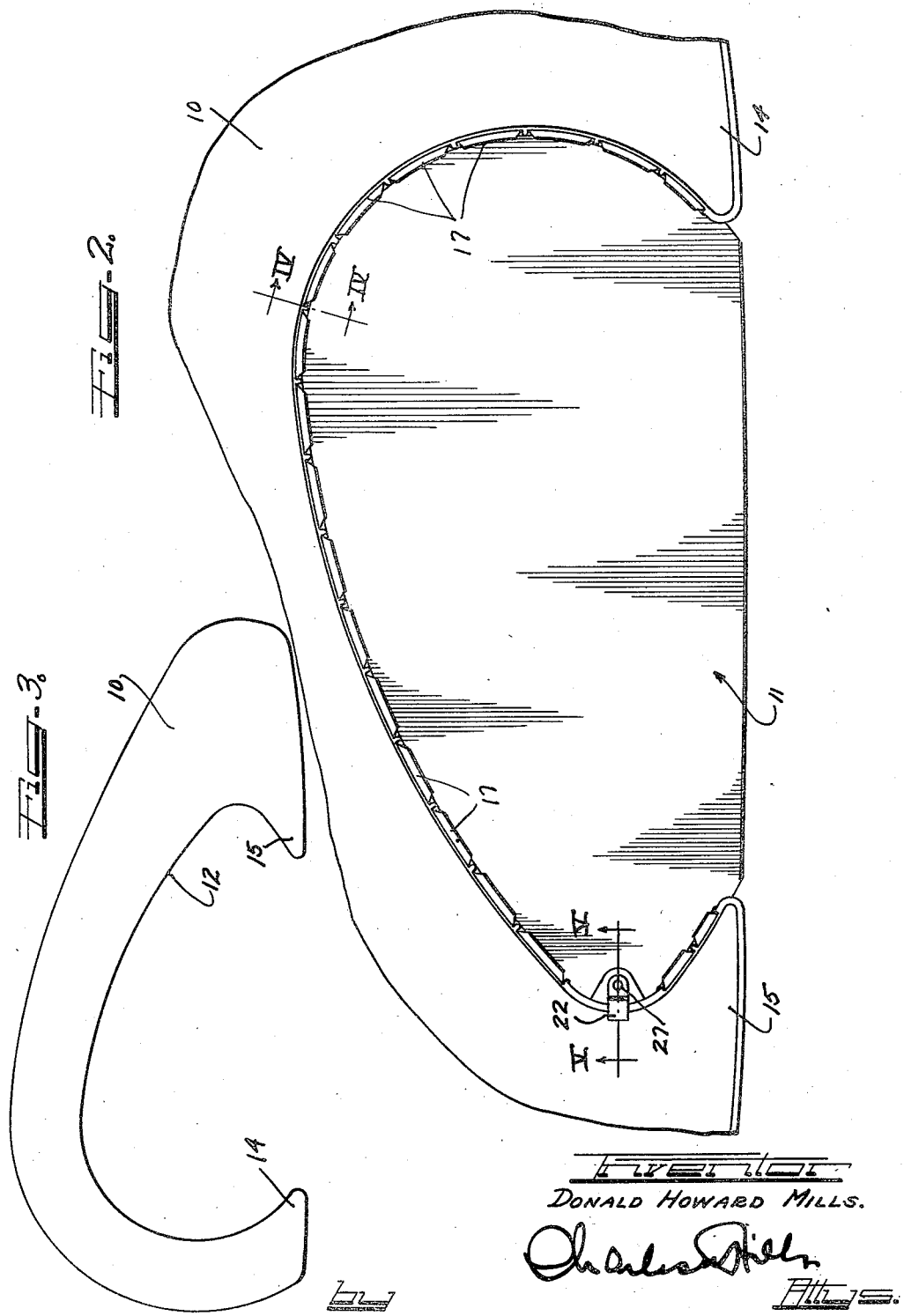

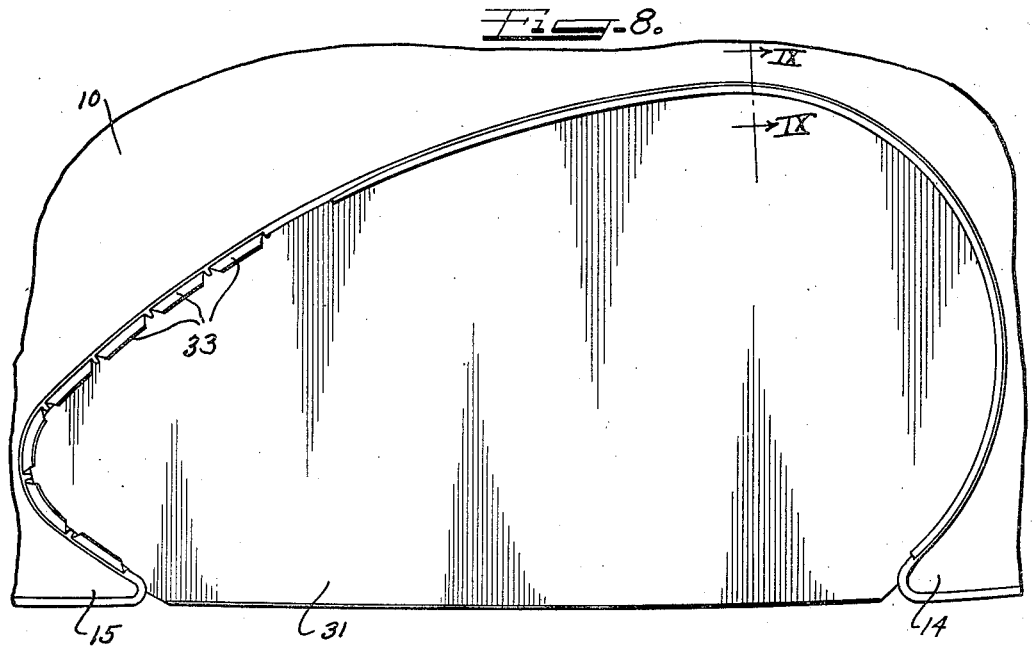
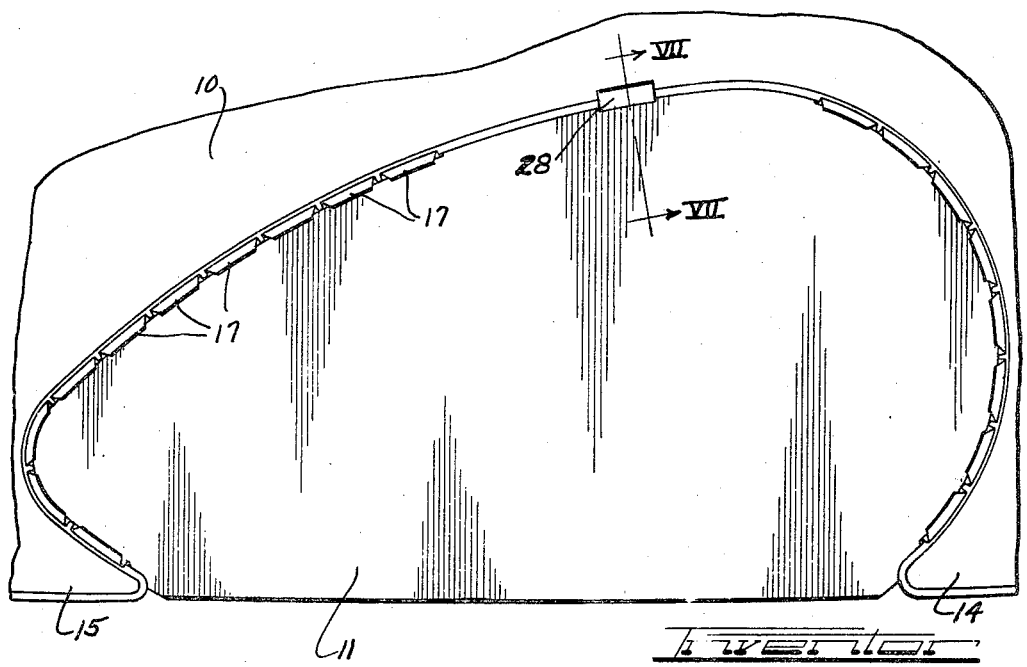

2,222,624

UNITED STATES PATENT OFFICE 2,222,624

FENDER, FENDER SHIELD, AND ASSEMBLY

Donald Howard Mills, Detroit, Mich., assignor to Houdaille-Hershey Corporation, Detroit, Mich., a corporation of Michigan Application January 9, 1939, Serial No. 249,930

7 Claims. (Cl. 280—153)

This invention relates to fenders and fender shields and the like, and more particularly to a new and novel fender or other vehicle body part having a downwardly depending outer wall for overhanging a vehicle wheel, and to a new and novel shield for disposition thereon.

In the vehicle industry, and particularly in the automobile industry, various means have been utilized to improve the appearance of vehicle fenders and the like. The usual vehicle fender is provided with an opening which affords access to the vehicle wheel, and which permits the ready removal of the wheel in an axial direction. This opening inherently presents an unattractive outward appearance, and accordingly detachable fender shields have been employed to substantially cover this opening. As the term "fender shield" shall hereinafter be employed, it refers to any member which is adapted to be secured to a fender or other portion of a vehicle body for the purpose of covering the opening in the fender or vehicle body which is provided for access to or removal of the vehicle wheel. It is also to be understood that the term "fender" is used in a broad sense and denotes any part of a vehicle body, whether separate or integral, which includes an outer depending side wall which overhangs the vehicle wheel.

It is an object of the present invention to provide a novel fender, fender shield, and assembly of the same.

It is a further object of this invention to provide a novel fender and fender shield assembly which is economical to manufacture and which is rugged and reliable in use.

It is a still further object of this invention to provide a novel fender or the like having an outer downwardly depending side wall in which a wheel access opening is provided, the marginal portion of the fender defining the opening as it approaches the base edge of the fender being turned back on itself to provide two opposing neck portions or projections on the fender.

Another and still further object of this invention is to provide a novel assembly of a vehicle fender having a wheel access opening therein, the two lower corners of which are defined by inturned confronting neck portions, and a fender shield supported on said inturned confronting neck portions.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a front elevational view of a fender and fender shield assembly illustrating one embodiment of the present invention;

Figure 2 is an enlarged rear elevational view of the fender shield and a portion of the fender on which it is mounted;

Figure 3 is a front elevational view of the fender with the shield removed;

Figure 4 is an enlarged cross-sectional view of the edge of the fender shield and fender taken between a pair of adjacent teeth or fingers on the fender shield as taken along the line IV—IV of Figure 2;

Figure 5 is an enlarged sectional view of the locking mechanism as taken along the line V—V of Figure 2;

Figure 6 is a rear elevational view of a different embodiment of the present invention;

Figure 7 is an enlarged cross-sectional view taken along the line VII—VII of Figure 6;

Figure 8 is a rear elevational view of a third embodiment of the present invention; and, Figure 9 is an enlarged cross-sectional view taken along the line IX—IX of Figure 8.

Referring now to the first embodiment of the present invention, which is not necessarily the preferred embodiment, there is illustrated therein a vehicle fender 10 of a high-crown type. Mounted on and detachably secured to the fender 10 is a fender shield 11 which is streamlined in shape, and designed to harmonize with the vehicle fender 10. As may be seen best in Figure 3, the fender 10 is provided with a wheel access opening 12, which is of substantially the same shape as the fender shield 11. The edge portion of the fender 10 around the opening 12 is underturned or rolled, as at 13 (see Figure 4).

In order to fully understand and appreciate the present invention, it is necessary to bear in mind that the usual form of wheel opening in a vehicle fender is an opening which is substantially semi-circular in shape. A few vehicle fenders of the present day are provided with openings other than semi-circular, such for example as those having a substantially spiral curve, the trailing edge of the opening extending obliquely downwardly and rearwardly. The fender of the present invention differs from all known structures in that the lower portion of the fender opening at each end thereof curves back on itself, thus providing a pair of confronting neck portions 14 and 15 on the fender 10. These confronting neck portions or projections 14 and 15 on the fender 10 are capable of performing a function which no previously known fender is capable of; namely, providing a seat upon which a fender shield may be seated. The neck portions or projections 14 and 15 thus comprise the sole vertical supporting means for the fender shield 11.

The fender shield 11 is substantially coextensive with the opening 12. The curved edge of the fender shield 11 is turned back on itself, as at 16, and then extends rearwardly in a plurality of teeth or cam fingers 17. Each of the fingers 17 is provided with a hump portion 18 which is adapted to be cammed under the underturned edge 13 of the fender 10 and snap up therebehind, the rear extremity 19 of the fingers 17 being bent obliquely rearwardly and radially inwardly to provide the necessary cam surface to cause the fingers 17 to snap under the underturned edge 13 when the fender shield 11 is forced axially rearwardly against the fender 10. In order to eliminate rattling and other noise of vibration, a yieldable cushioning strip 20 formed of any suitable cushioning material, such for example, as rubber, is secured to the inturned or folded back portion 16 of the fender shield 11 (see Figure 4).

To prevent accidental dislodging of the fender shield 11 from the fender 10, a safety latch 21 is provided at one side of the shield, as is shown in Figures 1 and 2. This safety latch 21 comprises a latching arm 22 which engages the underturned edge 13 of the fender 10, and an operating bolt 23 which extends through the fender shield 11 to the front side thereof. The operating bolt 11 is provided with a hexagonal head portion 24, a circular shank portion 25, and a square shank portion 26 upon which the latching arm 22 is mounted. The end of the square shank portion 26 is provided with an enlarged rear end 27 to prevent the latching arm 22 from coming off. It will be understood that the safety latch 21 merely augments the securing engagement provided by the fingers 17, and for that reason may be omitted if desired without departing from the spirit and scope of the present invention. To mount the fender shield 11 on the fender 10, the fender shield 11 is moved in an axial direction against the fender 10 until the fingers 17 snap under the underturned edge 13 which defines the opening 12 in the fender 10. The latching arm 22 is thereafter rotated by turning the head 24 of the operating bolt 23 with a lug wrench or the like until the latching arm 22 comes into engagement with the underturned edge 13, as shown in Figure 5. To dismount the fender shield 11 from the fender 10, the latching arm 22 of the latch mechanism 21 is rotated out of engagement with the underturned edge 13 of the fender 10 and the fender shield 11 is thereafter snapped out of engagement with the fender 10.

In Figures 6 and 7, I have illustrated a different embodiment of the present invention. In this form of the invention, the fender 10 is the same as that described in connection with the first embodiment of the invention and the fender shield 11 is substantially the same with the exception that the latching mechanism 21 is omitted therefrom and the fingers 17 are omitted along a portion of the top edge. As shown in Figures 6 and 7, an upstanding finger 28 is formed on the fender shield 11 along its top edge. More specifically, the finger 28 is formed by bending a portion 29 rearwardly from the inturned portion 16 and then upwardly as at 30. This finger 28 acts as a safety catch and prevents the accidental dislodging of the fender shield 11 from the fender 10 when the fender 10 is twisted and distorted, such for example as when the vehicle is passing over very rough roads. To mount the fender shield 11 of the second embodiment of the present invention on the fender 10, the upstanding finger 28 is hooked under the underturned edge 13 of the fender and the fender shield 11 is then pushed axially rearwardly until the fingers 17 are cammed under the underturned edge 13 into tight engagement with the underturned edge 13.

A third embodiment of the present invention is illustrated in Figures 8 and 9 of the drawings. In this form of the invention, the fender 10 is the same as that illustrated in the first embodiment of the invention, but the fender shield 31 in this case is provided with an outwardly opening channel 32 over a substantial portion of its curved edge including the leading edge of the fender shield. The shape of the channel-shaped edge is shown in Figure 9 of the drawings. This channel-shaped edge portion 32 extends from a point in close proximity to the lower leading corner (i. e., the corner towards the front of the vehicle) around the curved edge to a point past the middle of the fender. The trailing edge of the fender shield is provided with a plurality of fingers 33 which are similar to the fingers 17 described in connection with the first embodiment of the invention. In this form of the invention, as in the other forms of the invention previously described, the fender shield 31 is seated on the confronting neck portions 14 and 15 of the fender 10. It will be further remembered that the confronting neck portions 14 and 15 comprise the sole vertical support for the fender shield 31.

To mount the fender shield 31 on the fender 10, the fender shield 31 is moved obliquely upwardly and forwardly of the vehicle under the channel-shaped portion 32 is seated on the complementary shaped portion of the underturned edge 13. The trailing edge of the fender shield 31 is then pushed axially rearwardly until the fingers 33 snap under the underturned edge 13, thereby holding the fender shield 31 in firm and tight engagement on the fender 10. To dismount the fender shield 31 the reverse operation is carried out.

While I have shown particular embodiments of my invention, it will, of course, be understood, that I do not wish to be limited thereto, since many modifications may be made, and I, therefore, contemplate by the appended claims to cover all such modifications as fall within the true spirit and scope of my invention.

I claim as my invention:

1. In a fender and fender shield assembly, the combination comprising a fender having an elongated wheel access opening therein, the maximum width dimension of the opening being approximately located midway between the top and the bottom of the opening, and a fender shield disposed on said fender over the opening and having an inturned portion seated on the opening defining edge of said fender.

2. In a fender and fender shield assembly, the combination comprising a fender having an elongated wheel access opening therein, the maximum width dimension of the opening being approximately located midway between the top and the bottom of the opening, and a fender shield disposed on said fender over the opening having an inturned portion seated on the opening defining edge of said fender, said fender shield being vertically supported solely by said seating of said inturned portion on said opening defining edge.

3. In a fender and fender shield assembly, the combination comprising a fender having an elongated wheel access opening therein, the maximum width dimension of the opening being centrally located between the top and the bottom of the opening, and a fender shield disposed on said fender over the opening and having an inturned portion seated on the opening defining edge of said fender, said fender shield being vertically supported solely by said seating of said inturned portion on said opening defining edge, and resilient means extending around and in engagement with said fender edge for holding said shield laterally in tight engagement with said fender.

4. In a fender and fender shield assembly, the combination comprising a fender having an elongated wheel access opening therein, the maximum width dimension of the opening being approximately centrally located midway between the top and bottom of the opening, a fender shield disposed on said fender over the opening and having a portion of its edge channel-shaped for nested engagement over the opening defining edge of said fender, and having a second portion of its edge provided with a plurality of resilient latch fingers for extension around said opening defining edge of said fender, said fingers being located with respect to said channel-shaped portion to provide a biasing force maintaining said channel-shaped portion in tight nested engagement with said opening defining edge of said fender.

5. In a fender and fender shield assembly, the combination comprising a fender having a downwardly depending outer wall with a wheel access opening therein, the opening defining edge of said depending wall on either side of the opening converging in proximity to the base of the fender to provide a fender shield supporting seat, and a fender shield mounted on said fender over said opening and supported on said seat, said fender shield having a plurality of resilient fingers thereon extending through the opening into engagement with said opening defining edge of said fender.

6. In a fender and fender shield assembly, the combination comprising a fender having a downwardly depending outer wall with a wheel access opening therein, the opening defining edge of said depending wall on either side of the opening converging in proximity to the base of said fender, and a fender shield mounted on said fender over said opening, said fender shield having a plurality of resilient fingers at either end thereof for extension through the opening into engagement with the opening defining edge of said fender, and having an additional positive latching finger at the top of said shield extending into engagement with said fender.

7. In a fender and fender shield assembly, the combination comprising a fender having a downwardly depending outer wall with a wheel access opening therein, the opening defining edge of said depending wall on either side of the opening converging in proximity to the base of said fender to provide a fender shield supporting seat, and a fender shield seated on and vertically supported solely by said converging portions of said opening defining edge of said fender.

DONALD HOWARD MILLS.